United States Patent

Kawasaki et al.

Patent Number: 5,394,399
Date of Patent: Feb. 28, 1995

[54] COMMUNICATION CONTROL SYSTEM

[75] Inventors: Keiko Kawasaki, Tokyo; Kazuo Sumitani; Yoso Igi, both of Kawasaki; Fumiaki Tahira, Sagamihara; Kenji Fujisono, Yokohama, all of Japan

[73] Assignee: Fujitsu Limited, Kawasaki, Japan

[21] Appl. No.: 162,908

[22] Filed: Dec. 8, 1993

Related U.S. Application Data

[63] Continuation of Ser. No. 743,886, Aug. 12, 1991, abandoned.

[30] Foreign Application Priority Data

Aug. 10, 1990 [JP] Japan .................. 2-210396

[51] Int. Cl.⁶ ............................................. H04J 3/22
[52] U.S. Cl. .................................................. 370/84
[58] Field of Search ............... 370/84, 110.1, 109, 370/85.1; 341/50, 60, 61, 123, 143; 364/166, 179, 559; 358/426; 375/122

[56] References Cited

U.S. PATENT DOCUMENTS

| | | | |
|---|---|---|---|
| 4,484,327 | 11/1984 | Hanson | 370/84 |
| 4,750,171 | 6/1988 | Kedar et al. | 370/85.1 |
| 4,805,171 | 2/1989 | Ewell | 370/110.1 |
| 4,864,301 | 9/1989 | Helferich | 341/60 |
| 4,953,180 | 8/1990 | Fieschi et al. | 370/84 |
| 4,972,354 | 11/1990 | Hauck et al. | 364/559 |
| 4,979,166 | 12/1990 | Yamada | 370/84 |
| 4,979,169 | 12/1990 | Almond et al. | 370/84 |
| 5,020,053 | 5/1991 | Ishikawa et al. | 370/84 |
| 5,038,365 | 8/1991 | Belloc et al. | 341/61 |
| 5,134,612 | 7/1992 | Yoshimura | 370/84 |

Primary Examiner—Douglas W. Olms
Assistant Examiner—Dang Ton
Attorney, Agent, or Firm—Staas & Halsey

[57] ABSTRACT

A communication control device includes a transmission speed converting unit having a dual port video RAM containing a RAM and a SAM, and a control unit having a register for storing a data store leading address of the RAM, a register for setting the number of words stored in the SAM, and a CPU. When data are transmitted, a user issues a data transmission request to the CPU in the control unit. According to the request, the CPU reads data from one system at its data transmission speed to the RAM or the SAM of the dual port video RAM, internally transmits the data between the RAM and the SAM, and finally transmits the internally transmitted data to the other system at its data transmission speed. The dual port video RAM absorbs the difference between the data transmission speeds of these two systems, and permits the data transmission at a lower cost than when using a FIFO memory and at a higher speed than when using a buffer memory.

8 Claims, 8 Drawing Sheets

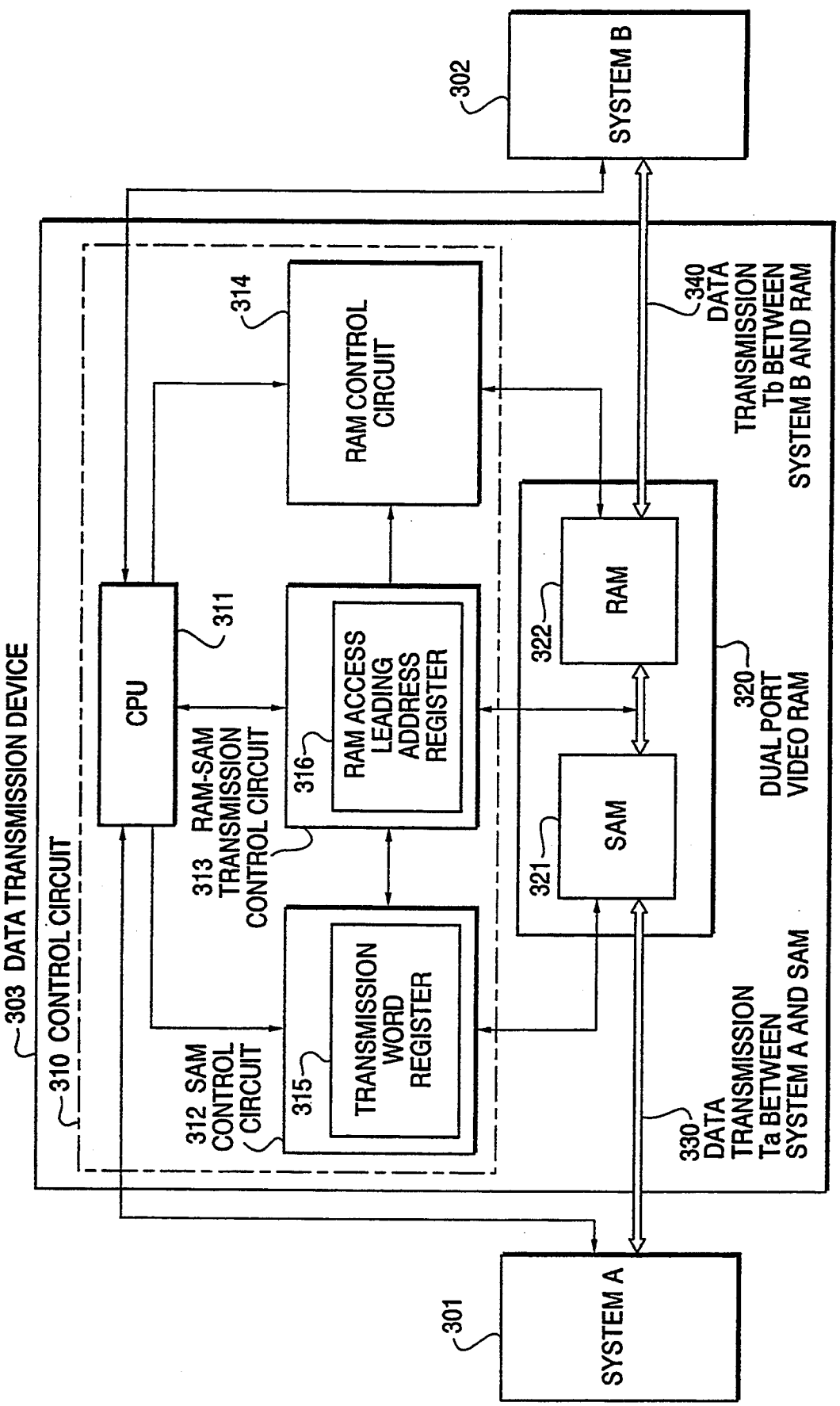

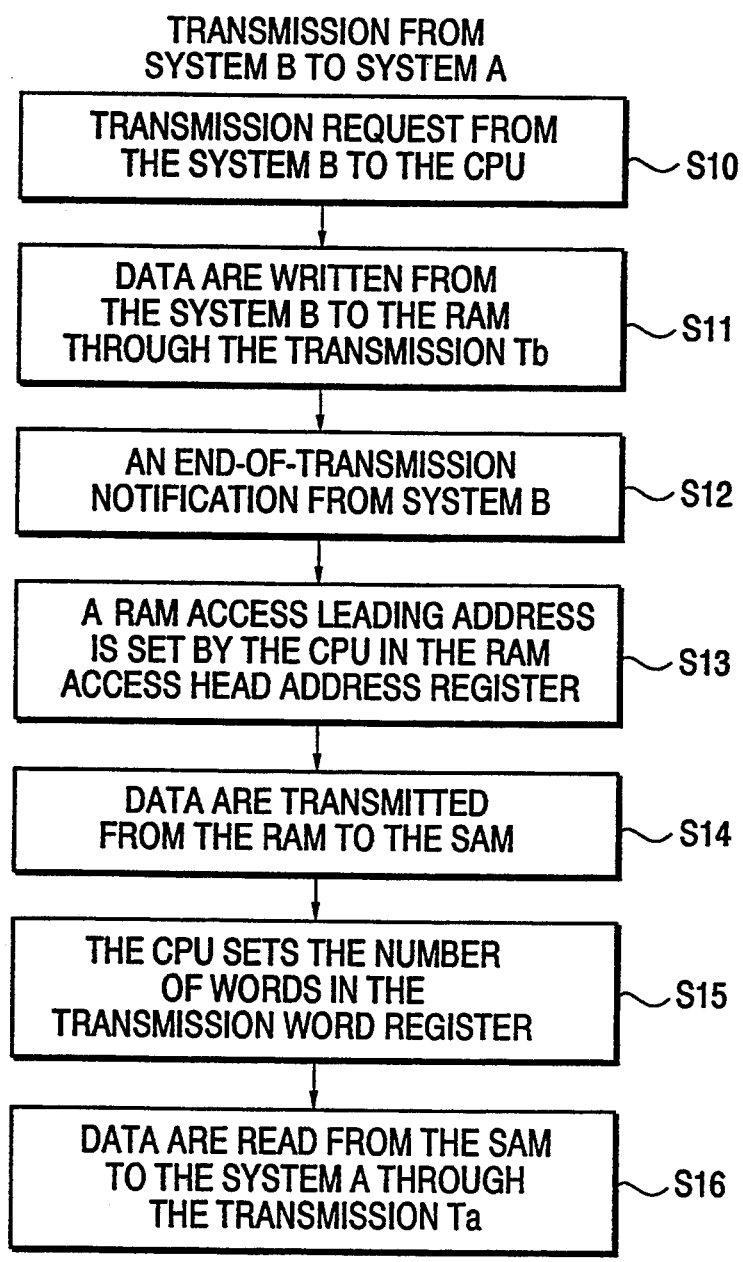

COMMUNICATION CONTROL SYSTEM

This application is a continuation of application Ser. No. 07/743,886, filed Aug. 12, 1991, now abandoned.

BACKGROUND OF THE INVENTION

1. Field of the Invention

The present invention relates to a communication control system capable of transmitting data after converting the data transmission speed when the data transmission speeds of a sending system and a receiving system differ.

2. Description of the Related Art

With progress in data communication technology, data are being transmitted at increasing speeds. Thus, development of data communication technology is required to facilitate communication between two systems having different data transmission speeds.

To realize data communication between two systems having different data transmission speeds, there are two conventional methods as shown in FIGS. 1A and 1B.

The first method shown in FIG. 1A is to realize the data communication between two systems (a system A101 and a system B102) having different transmission speeds by converting the transmission speed through a main memory 103 and a buffer memory 104, both provided between the two systems having different data transmission speeds (system A 101 and system B 102).

System A 101 is connected to the buffer memory 104 through a communication line, the buffer memory 104 is connected to the main memory 103 and the main memory 103 is connected to system B 102 through a communication line. Data transmission between system A 101 and the buffer memory 104 is controlled by a DMA controller 105 (DMAC-A), data transmission between the buffer memory 104 and the main memory 103 is controlled by a CPU 106, and data transmission between the main memory 103 and system B 102 is controlled by a DMA controller 107 (DMAC-B).

In transmitting data from system B 102 to system A 101, data are first transmitted from system B 102 to the main memory 103 under the control of the DMAC-B107. This transmission Tb108 is performed at the data transmission speed of system B 102. Then, the transmission data stored in the main memory 103 are read one by one by the CPU 106 and written in the buffer memory 104. This process is executed by a normal READ/WRITE command of the CPU 106. Finally, the data are transmitted from the buffer memory 104 to system A 101 under the control of the DMAC-A105. This transmission Ta109 is performed at the data transmission speed of system A 101.

On the other hand, in transmitting data from system A 101 to system B 102, the data are first transmitted by DMA from system A 101 to the buffer memory 104 under the control of the DMAC-A 105. Then, the data are read from the buffer memory 104 by the CPU 106, and written to the main memory 103. Finally, the data are transmitted by DMA from the main memory 103 to system B 102 under control of the DMAC-B 107.

As described above, in the first method the main memory 103 and the buffer memory 104 are provided between system A 101 and system B 102 and the transmission between the buffer memory 104 and the main memory 103 is executed by READ/WRITE of the CPU 106, thus absorbing the difference in the transmission speeds of transmission Ta109 of system A 101 and transmission Tb108 of system B 102.

The second method shown in FIG. 1B is to provide a FIFO memory 110 between system A 101 and system B 102. In the FIFO memory 110, the write and read operations must be set to different speeds.

The FIFO memory 110 is controlled by the CPU 106. First, data from system A 101 are written in the FIFO memory 110. This transmission Ta109 is performed at the transmission speed of system A 101. Then, the data written in the FIFO memory 110 are transmitted sequentially to system B 102. This transmission Tb108 is performed at the transmission speed of system B 102.

However, there are problems with both of these methods.

In the first method, data transmitted to the main memory 103 or the buffer memory 104 are read in words by the CPU 106, and then written in the buffer memory 104 or the main memory 103. In this method, the transmission speed is exceedingly low. Besides, as the main memory 103 and the buffer memory 104 are controlled by one CPU 106, the transmission Ta109 of system A 101 and the transmission Tb108 of system B 102 cannot be performed simultaneously, thus further reducing the transmission speed. Furthermore, in this method the memory capacity of both the buffer memory 104 and the main memory 103 must be large. Another problem is that the CPU cannot be operated during a data transmission.

In the second method, as the FIFO memory is used where different input/output speeds are permitted, there is no problem reduction in data transmission speed. However, there is the problem that the FIFO memory is expensive, although it is effective in optionally setting input/output speed.

SUMMARY OF THE INVENTION

An object of the present invention is to configure a data communication device with a lower cost than a FIFO memory, for transmitting data between two systems having different data transmission speeds, and for performing higher speed data transmission.

The present invention relates to a data transmission device for transmitting data between two systems (system A and system B) after converting a data transmission speed.

The present invention comprises a transmission speed converting unit for transmitting data between a system A and a system B after converting a data transmission speed, and a control unit for controlling the conversion of the transmission speed and the data transmitting process to be performed by said transmission speed converting unit.

In the configuration of the present invention described above, the transmission speed converting unit comprises a dual port video RAM having a serial access memory SAM and a RAM. The system A is connected to a port of either the SAM or the RAM, and the system B to the port of the other. The data transmission between either of the systems and the dual port video RAM can be performed at the transmission speed of either system, and the data transmission between the SAM and the RAM in the dual port video RAM can be performed as an internal transmitting process.

The control unit Comprises a register for storing the start of a store address in the dual port video RAM of the transmission speed converting unit, a register for storing the number of data words in the SAM, and a CPU.

According to the above described configuration of the present invention, data can be transmitted between two systems having a different transmission speed using only one dual port video RAM, and a data transmission system can be realized at a lower cost than when a FIFO memory is used for converting a transmission speed.

By using a dual port video RAM, the internal transmission between the RAM and the SAM can be performed in blocks, thus making the transmission speed higher than in the data transmission by a RAM and a buffer memory.

Moreover, as a CPU only monitors data transmission requests and the end of data transmissions, it can execute other processes during data transmission, thus improving its performance.

BRIEF DESCRIPTION OF THE DRAWINGS

Other objects and features of the present invention can be easily shown by referring to associated drawings as follows:

FIG. 3 is a block diagram of a system configuration of an embodiment of the present invention;

FIGS. 4A and 4B are shows an operational flowchart of a data transmission;

DESCRIPTION OF THE PREFERRED EMBODIMENT

Figure 1A:
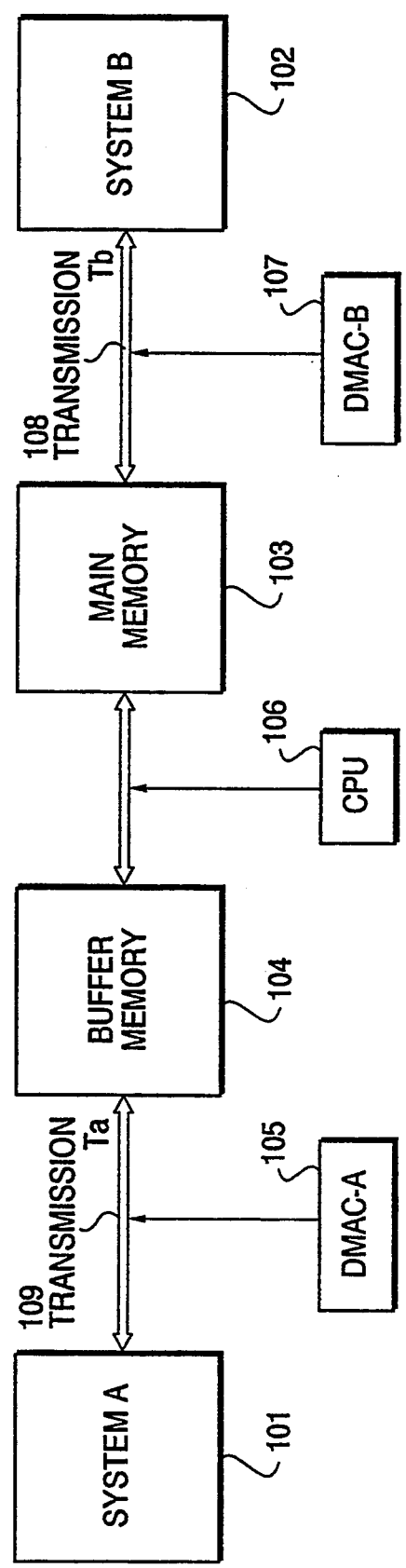
FIGS. 1A and 1B are shows an explanatory view of the prior art technology.
Figure 1B:
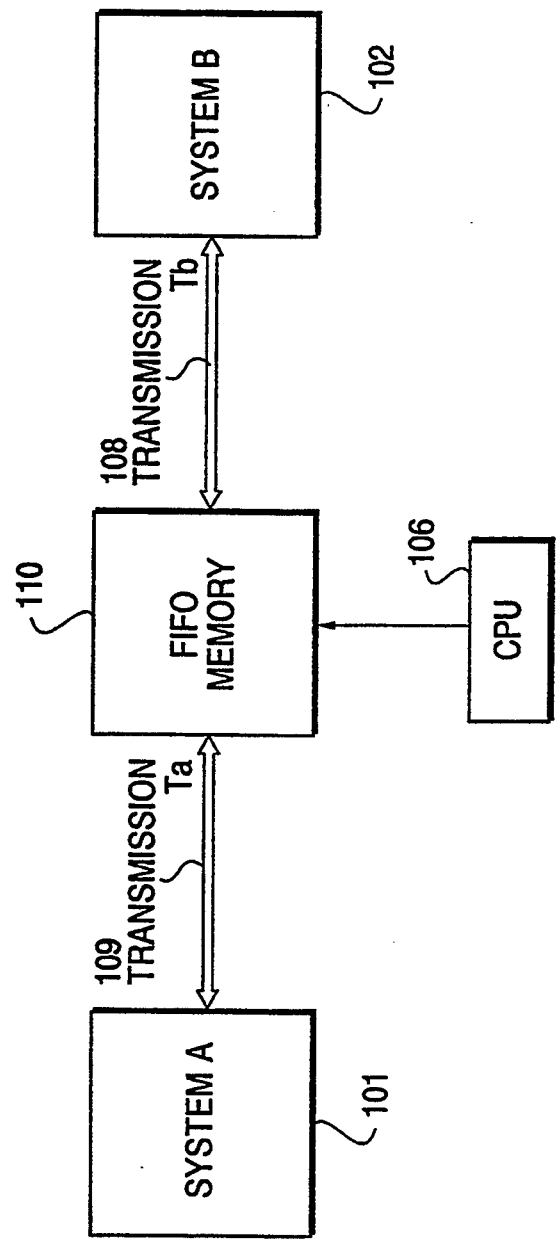
Figure 2:
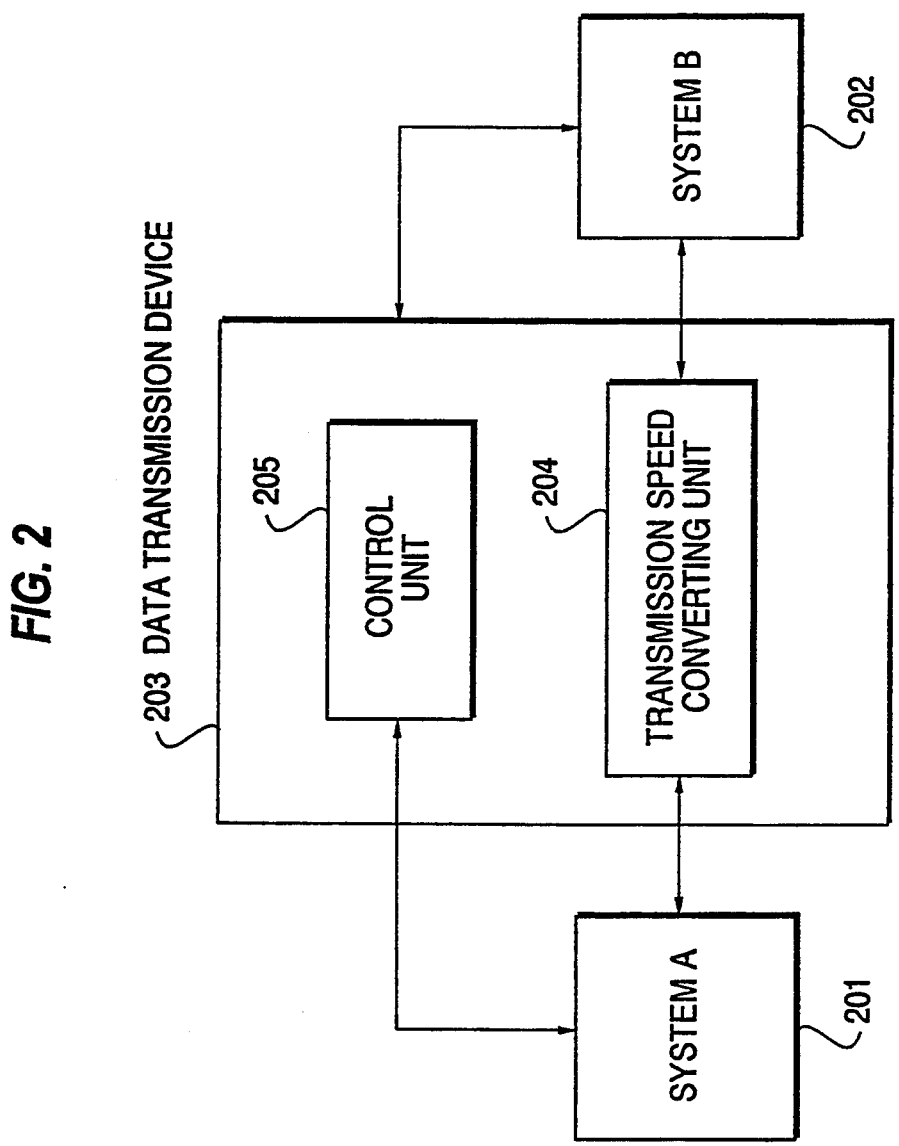
FIG. 2 is a block diagram illustrating the principle of the present invention.

FIG. 2 is a block diagram illustrating the principle of the present invention. The present invention relates to data transmission between a system A 201 and a system B 202 having different data transmission speeds, and to a data transmission device 203 provided between the two systems.

The data transmission device 203 comprises a transmission speed converting unit 204 for converting a data transmission speed before transmitting data between the system A201 and the system B 202. The transmission speed converting unit 204 comprises a dual port video RAM having a RAM (random access memory) and a SAM (serial access memory). The RAM port and the SAM port are each connected to one of the systems. Let us suppose that the SAM port is connected to system A 201 and the RAM port to system B 202.

In transmitting data from system A 201 to system B 202, the data from system A 201 are stored in the SAM through the SAM port in the dual port video RAM, transmitted internally from the SAM to the RAM in the dual port video RAM, and finally transmitted to system B 202 through the RAM port. On the other hand, in transmitting data from system B 202 to system A 201, the data from system B 202 are stored in the RAM through the RAM port in the dual port video RAM, transmitted internally from the RAM to the SAM in the dual port video RAM, and finally transmitted to system A 201 through the SAM port.

A control unit 205 is also provided in the data transmission device 203. It controls the data transmission by the transmission speed converting unit 204.

The control unit 205 comprises a RAM head or leading address setting register for setting the head address from which data are transmitted and stored in the RAM in the dual port video RAM, and a transmission word number setting register for setting the number of data words to be stored in the SAM in the dual port video RAM. When an address is set in the RAM leading address setting register, the control unit 205 activates the data transmitting process between the RAM and the SAM in the dual port video RAM. However, when the number of words is set in the transmission word number setting register, the control unit 205 activates the data transmitting process between the SAM and the system A201.

In transmitting data from system A 201 to system B 202, the control unit 205 receives a command to write data from system A 201 to the SAM, sets an address in the RAM leading address setting register, sets the transmission direction from the SAM to the RAM, sets the word number of the transmission word number setting register, controls the activation of the data transmission from the SAM to the RAM, and executes a RAM data read request. When data are transmitted from system B 202 to system A 201, the control unit 205 receives a command to read data from the SAM to system A 201, sets a leading address in the RAM leading address setting register, activates the internal transmission from the RAM to the SAM, sets the word number of the transmission word setting register, and activates the data transmission from the SAM to system A 201.

The operation of the above described principle is explained below.

Suppose data are transmitted from the system A 201 to the system B 202.

System A 201 requests the data transmission device 203 to transmit data to system B 202. The control unit 205 in the data transmission device 203 receives the transmission request. It then sets in its RAM access head address register a store address in the RAM in the transmission speed converting unit 204, and sets the internal transmission direction from the SAM to the RAM within the transmission speed converting unit 204. Then, it receives the transmission word number information from system A 201, and sets the data word number to be transmitted to its transmission word register.

With completion of setting the number of words to be transmitted to the transmission word register as a trigger, the control unit 205 activates the data transmission from system A 201 to the SAM in the transmission speed converting unit 204. Then, the data are transmitted sequentially from system A 201 to the SAM, and sequentially stored in the SAM from its head address. The data from the system A 201 are stored in the SAM until the SAM is filled or the transmission from the system A201 is terminated when it sends a signal to the control unit 205 notifying the end of the transmission.

The control unit 205 receives the end of data transmission (from system A 201 to the SAM) signal, and activates the internal transmission from the SAM to the RAM in the transmission speed converting unit 204. Then, the transmission data are outputted sequentially from the head of the SAM, and then stored in the RAM. Store addresses of the RAM are stored sequentially with the address set in the RAM access leading address register in the control unit 205 as the leading address.

When data transmission from the SAM to the RAM is terminated, the transmission speed converting unit 204 notifies the control unit 205 of the termination. The control unit 205 then requests the system B 202 to read data from the RAM. System B 202 receives the request and reads data from the RAM in the transmission speed converting unit 204. A data read address is designated in the RAM access head address register in the control unit 205.

According to the whole operation described above, data are transmitted from system A 201 to system B 202.

In transmitting data from system B 202 to system A 201, system B 202 sends a transmission request to the data transmitting device 203. Then, system B 202 writes data in the RAM of the transmission speed converting unit 204. When the data are all written from system B 202 to the RAM, system B 202 sends an end-of-transmission notification to the control unit 205.

The control unit 205 receives this end-of-transmission notification, and sets the leading address of the data stored in the RAM by system B 202 in the RAM access leading address register of the control unit 205. When the setting is completed, the control unit 205 activates the internal transmission between the RAM and the SAM in the transmission speed converting unit 204.

The transmission speed converting unit 204 sends transmission data stored in the RAM to the SAM, and stores data sequentially from the head of the SAM. When all data are transmitted from the RAM to the SAM, a signal for notifying the end of the transmission is sent to the control unit 205.

The control unit 205 receives the end-of-transmission (from the RAM to the SAM) signal, and sets the number of words of transmission data stored in the SAM in the transmission word register. After the number of words is set, system A 201 is instructed to read data from the SAM. System A 201 reads, sequentially from the head of the SAM, the specified number of words of data which is set in the transmission word register of the control unit 205.

The above process completes the data transmission from system B 202 to system A 201.

An embodiment of the present invention is explained below in reference to the drawings.

FIG. 3 shows a configuration of an embodiment of the present invention as a combination of a data transmission device 303 comprising a system A 301, a system B 302, and a data transmission device 303 having a control circuit 310 and a dual port video RAM 320.

First, system A 301 and system B 302 are CPU systems comprising, for example, a microprocessor, a memory, an input/output interface, etc.

The data transmission device 303 comprises a dual port video RAM 320 for transmitting data from system A 301 to system B 302 after converting a data transmission speed, and a control circuit 310 for controlling the data transmission by the dual port video RAM 320.

The dual port video RAM 320 comprises a SAM 321 for sequentially performing input and output of data and a common RAM 322. The SAM 321 and the RAM 322 are connected in the dual port video RAM 320. The input/output port of the SAM 321, which is one port of the dual port video RAM 320, is connected to system A 301 and performs the transmission Ta330 between system A 301 and the SAM 321. The input/output port of the of the RAM 322, which is the other port of the dual port video RAM 320, is connected to system B 302 and performs the transmission Tb340 between system B 302 and the RAM 322.

The transmission Ta330 between system A 301 and the SAM 321 and the transmission Tb340 between system B 302 and the RAM 322 are performed based on the DMA (direct memory access) transmission. However, the transmission speeds of data transmissions Ta330 and Tb340 differ.

The control circuit 310 comprises a CPU 311 for controlling the control circuit 310, a SAM control circuit 312, a RAM-SAM transmission control circuit 313 for controlling the transmission between the SAM 321 and the RAM 322 in the dual port video RAM, and a RAM control circuit 314 for controlling the RAM 322 in the dual port video RAM. The SAM control circuit 312 contains a transmission word register 315, and a RAM-SAM transmission control circuit 313 contains a RAM access leading address register 316. The transmission word register 315 is a register for setting the number of words of data to be transmitted between the system A301 to the SAM 321 in the dual port video RAM 320. In the RAM access leading address register 316, the leading address of a data storing memory is set before the data transmission to the RAM 322 in the dual port video RAM 320.

The CPU 311 is connected to the SAM control circuit 312, the RAM-SAM transmission control circuit 313, the RAM control circuit 314, system A 301, and system B 302. The SAM control circuit 312 is connected to the CPU 311, the SAM 321, and the RAM-SAM transmission control circuit 313. The RAM control circuit 314 is connected to the CPU 311, the RAM 322, and the RAM-SAM transmission control circuit 313. The RAM-SAM transmission control circuit 313 is connected to the CPU 311, the SAM control circuit 312, the RAM control circuit 314, and the signal line between the SAM 321 and the RAM 322 in the dual port video RAM 320.

Next, the operation of this system is explained with reference to the operational flowchart in FIGS. 4A and 4B.

Figure 4A:
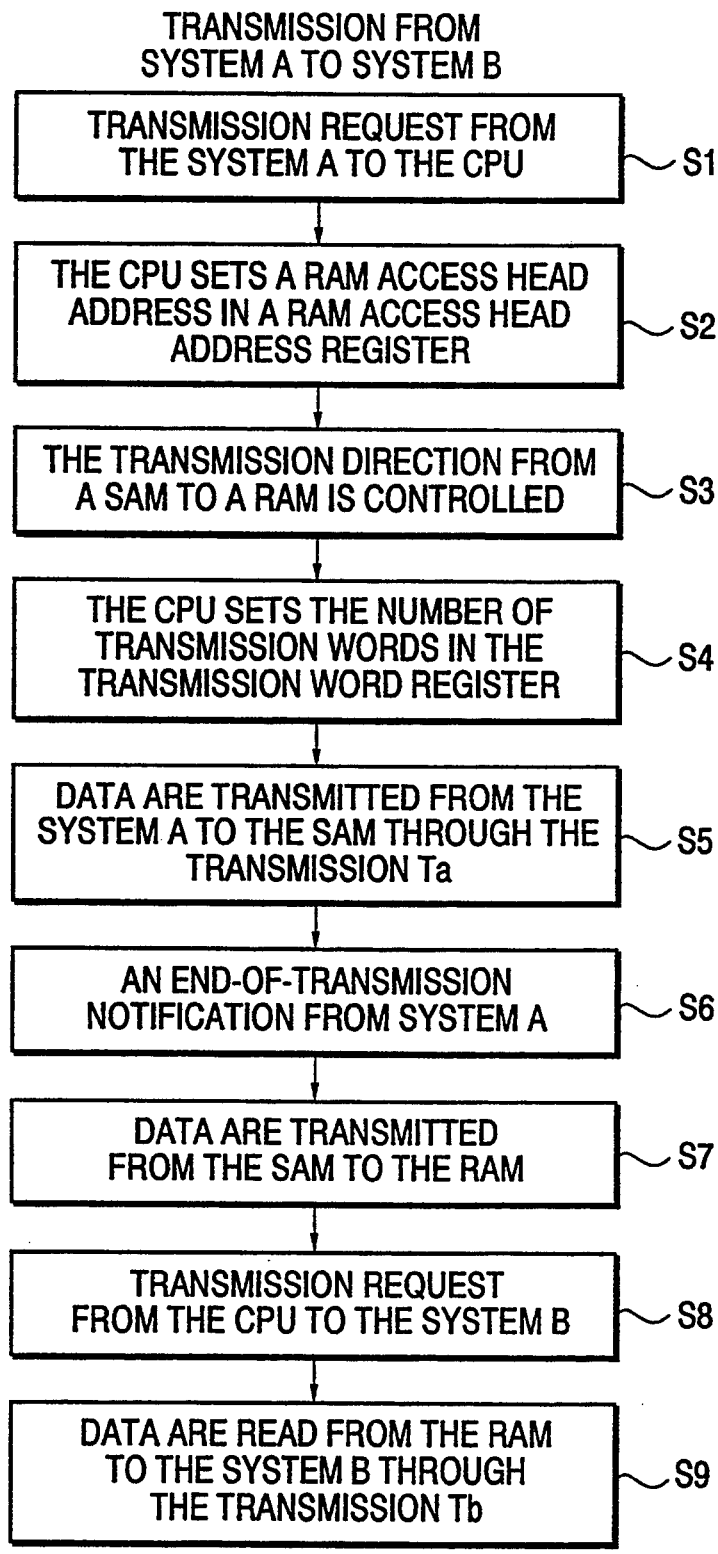

First, data are transmitted from system A 301 to the system B 302 (FIG. 4A).

System A 301 requests the CPU 311 in the control circuit 310 to transmit data between system A 301 and system B 302 (S1). The CPU 311 receives this request signal, and sets in the RAM access leading address register 316 of the RAM-SAM transmission control circuit 313 the leading address in which data are stored (S2). After the leading address is set, the RAM-SAM transmission control circuit 313 sends the data transmission direction information from the SAM 321 to the RAM 322 to the signal line between the SAM 321 and the RAM 322 in the dual port video RAM 320 (S3).

Next, the CPU 311 sets the number of words to be transmitted from system A 301 in the transmission word register 315 in the SAM control circuit 312 (S4). After the number of words is set, the SAM control circuit 312 sends an instruction to the SAM 321 to activate the data transmission between system A 301 and the SAM 321. Upon receiving the instruction signal, data are transmitted from system A 301 to the SAM 321 as the data transmission Ta330 (S5). The data transmission Ta330 is performed normally through the DMA transmission. The transmission data are inputted sequentially to the SAM 321, and the inputted data are stored sequentially from the head of the SAM 321.

When all data are transmitted from system A 301 to the SAM 321, the SAM 321 sends an end of transmission signal to the SAM control circuit 312 (S6). The SAM control circuit 312 notifies the RAM-SAM transmission control circuit 313 of the termination of the transmission between system A 301 and the SAM 321. In response to this notification, the RAM-SAM transmission control circuit 313 sends to a signal line between the SAM 321 and the RAM 322 a start-of-transmission signal between the SAM 321 and the RAM 322. According to this signal, data transmission is started between the SAM 321 and the RAM 322 (S7).

The data stored in the SAM 321 is sequentially outputted from the head of the SAM 321 and sent to the RAM 322. All data in the SAM 321 can be sent to the RAM 322 by a single signal. A store address in the RAM 322 is controlled by the RAM access leading address register 316, and sequentially stored in the memory following the leading address. When the transmission between the SAM and RAM is completed, an end-of-transmission signal is sent from the dual port video RAM 320 to the RAM-SAM transmission control circuit 313. This signal is transmitted from the RAM-SAM transmission control circuit 313 to the CPU 311.

The CPU 311 receives the end-of-transmission signal between the RAM and the SAM, and sends an instruction to system B 302 to read transmission data from the RAM 322 (S8). System B 302 receives this instruction and reads data from the RAM 322 through the transmission Tb340 (S9). Normally, the data transmission Tb340 is performed as a DMA transmission, and the data transmission Tb340 is controlled by the RAM control circuit 314. That is, the RAM control circuit 314 is informed of the leading address of the data stored in the RAM 322 by the content of the RAM access leading address register 316 in the RAM-SAM transmission control circuit 313, and then DMA-transmits data sequentially from the leading address.

The above described process completes the data transmission from system A 301 to system B 302. Generally, the capacity of the SAM 321 is small. Thus, the amount of data to be transmitted from the system A 301 often exceeds the capacity of the SAM 321. In this case, process S1–S9 is repeated several times to transmit all data.

Next, the procedure for transmitting data from system B 302 to system A 301 is described (FIG. 4B).

In transmitting data from system B 302 to system A 301, system B 302 requests the CPU 311 to transmit data to system A 301 (S10). System B 302 writes the transmission data in the RAM 322 through the data transmission Tb340 (S11). Usually, the data transmission Tb340 is performed by DMA transmission. When all data are written in the RAM 322, system B 302 sends an end-of-transmission signal to the CPU 311 (S12).

The CPU 311 receives the end-of-transmission signal, and sets in the leading address register 316 of the RAM-SAM transmission control circuit 313 a leading address of the RAM 322 where transmission data are written by the system B301 (S13). When the leading address is set, the RAM-SAM transmission control circuit 313 sends to the dual port video RAM 321 a signal for showing the direction of the transmission from the RAM 322 to the SAM 321. After the transmission direction is set, the internal transmission between the RAM 322 and the SAM 321 is activated (S14).

This internal transmission is controlled by the RAM-SAM transmission control circuit 313. That is, one signal issued by the RAM-SAM transmission control circuit 313 outputs data at the maximum capacity of the SAM 321, and the outputted data are sent to the SAM 321 and stored there sequentially from the head of the RAM 322.

When the transmission is completed, an end-of-transmission signal is sent from the RAM-SAM transmission control circuit 313 to the CPU 311. In response to this signal, the CPU 311 sets in the transmission word register 315 of the SAM control circuit 312 the number of words of the data transmitted internally from the RAM 322 to the SAM 321 (S15). When the number of words is set, the SAM control circuit 312 sends to the SAM 321 a signal for activating the data transmission Ta330 between the SAM 321 and system A 301. Then, the CPU 311 sends an instruction to system A 301 to read data from the SAM 321.

In response to this instruction, system A 301 reads data for the number of words in the SAM 321 indicated in the transmission word register 315. The data transmission Ta330 is usually performed by DMA transmission.

In the dual port video RAM 320, the capacity of the RAM 322 is usually larger than that of the SAM 321. If the amount of data transmitted from the system B 302 to the RAM 322 is larger than the capacity of the SAM 321, all processes from the internal transmission (S14) in the dual port video RAM 320, that is, S14–S16, are repeated several times.

The processes described above complete the data transmission from system B 302 to system A 301. Thus, data can be transmitted between system A 301 and a system B 302 having different data transmission speeds.

Figure 5:
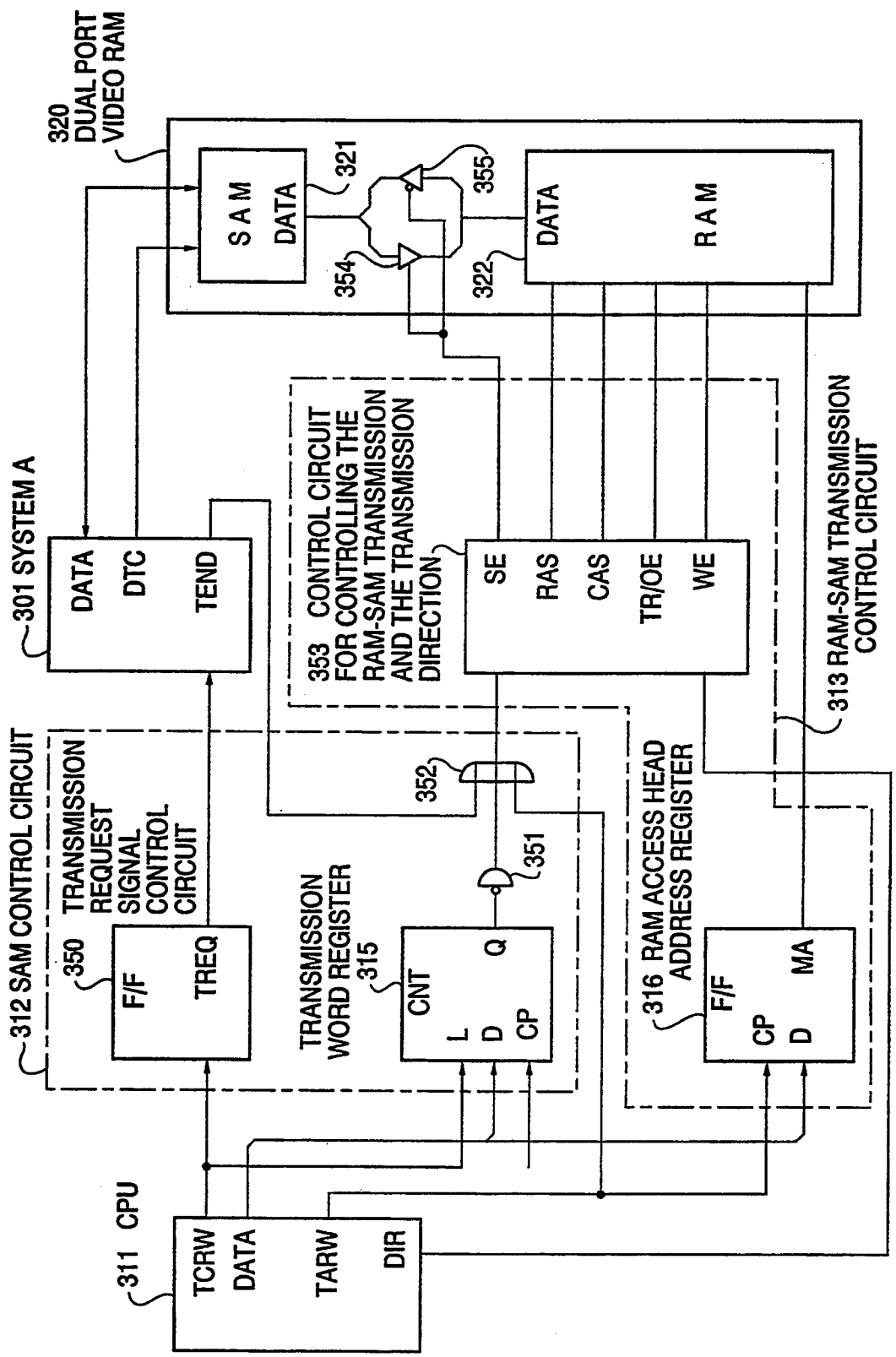
FIG. 5 is a diagram showing a system configuration of the transmission control circuit.

FIG. 5 shows a detailed block diagram of the control circuit 310.

A micro-processor is provided in the CPU 311. The SAM control circuit 312 comprises a transmission request signal control circuit 350 for issuing to the system A 301 a transmission request between system A 301 and the SAM 321, a transmission word register 315, a negative input AND gate 351, and a three-input OR gate 352. The transmission request signal control circuit 350 is a flip flop circuit and the transmission word register 315 is a shift register.

The RAM-SAM transmission control circuit 313 comprises a RAM access leading address register 316 and a control circuit 353 for controlling the transmission between a RAM and a SAM and the transmission direction. The RAM access head address register 316 is a flip flop circuit.

The dual port video RAM 320 comprises a SAM 321, a RAM 322, and two drivers (354 and 355). In the illustration, only system A 301 connected to the SAM 321 of the dual port video RAM 320 is indicated, and system B 302 connected to the port on the RAM 322 is omitted. The explanation of the data transmission between system B 302 and the RAM 322 is omitted here because a normal write/read operation is performed under control of the RAM control circuit 314.

A data input/output terminal (DATA) of the system A 301 is connected to the SAM 321 of the dual port video RAM 320 and is used for the two-way data communication. Likewise, a synchronous signal terminal DTC (data transmission command) of system A 301 is connected to the SAM 321, and sends a synchronous signal to it.

In the dual port video RAM 320, the DATA terminal of the SAM 321 and the DATA terminal of the RAM 322 permit one-word-width transmission. To designate the transmission direction between the SAM 321 and the RAM 322, each data line is divided into two, each connecting the DATA terminal of the SAM 321 and the DATA terminal of the RAM 322 through drivers 354 and 355, respectively. The connections of the drivers 354 and 355 face in opposite directions. Each is connected to a signal line (SE) from the control circuit 353 for controlling the transmission between the RAM and the SAM and the transmission direction. The signal line SE transmits a signal for controlling a direction of a signal to be transmitted between the SAM and the RAM. When the SE shows a low level, the driver 354 transmits data from the SAM 321 to the RAM 322 because the SE controls the driver with negative logic. When the SE shows a high level, data can be transmitted from the RAM 322 to the SAM 321.

Next, the circuit connection of a control circuit is described.

A TCRW terminal (a write signal terminal of a transmission word register) of the CPU 311 is connected to the transmission request signal control circuit 350 of the SAM control circuit 312 and an L terminal of the transmission word register 315, and sends a timing signal used for writing transmission words. The TARW terminal (RAM access head address register write signal terminal) of the CPU 311 is connected to a CP terminal of the RAM access leading address register 316 of the RAM-SAM transmission control circuit 313 and an OR terminal 352 of the SAM control circuit 312, and sends a timing signal used for writing a RAM access head address.

A DATA terminal of the CPU 311 is connected to a D terminal of the transmission word register 315 of the SAM control circuit 312 and to a D terminal of the RAM access leading address register 316 of the RAM-SAM transmission control circuit 313. Data such as the number of words and a RAM access leading address are transmitted from a DATA terminal of the CPU 311. A DIR terminal (transmission direction designating terminal) of the CPU 311 is connected to the control circuit 353, in the RAM-SAM transmission control circuit 313, for controlling the transmission between the RAM and the SAM and the transmission direction, and sends a signal for indicating the internal transmission direction in the dual port video RAM 320 (from RAM to SAM or from SAM to RAM).

A TREQ terminal of the transmission request signal control circuit 350 in the SAM control circuit 312 is connected to system A 301 and outputs a transmission request signal to system A 301 in response to an input of a transmission word register write signal (TCRW).

In addition to the transmission word register write signal (TCRW) and the DATA signal, a CP signal (clock pulse signal) is an input to the transmission word register 315 in the SAM control circuit 312. As an output, the number of transmission words are outputted from the Q terminal. The output (Q) is inputted to the AND gate 351 of a negative input. When the number of transmission words outputted from the transmission word register 315 shows 0 through the negative input AND gate 351, the negative input AND gate 351 outputs a high level ('1').

This output is sent to the three-input OR gate 352. Two other input terminals of the OR gate 352 are connected to the TEND terminal (end-of-transmission terminal) of the system A 301 and to the TARW terminal of the CPU 311 (RAM access leading address register write signal). The output of the three-input OR gate 352 is applied as an input signal, for indicating the activation or the termination of the SAM-RAM transmission, of the control circuit 353 for controlling the SAM-RAM transmission and the transmission direction.

A TARW signal (RAM access leading address register write signal) and data (DATA) from the CPU 311 are applied as the inputs of the RAM access leading address register 316 of the RAM-SAM transmission control circuit 313. An address signal of the RAM is sent from a RAM address (MA) terminal to the RAM 322 of the dual port video RAM 320 as an output.

An output signal of the above described three-input OR gate 352 and a transmission direction designating signal (DIR) from the CPU 311 are applied as inputs of the control circuit 353, in the RAM-SAM transmission control circuit 313, for controlling the RAM-SAM transmission and the transmission direction. The control circuit 353 outputs a SAM-RAM transmission direction control signal (SE terminal), a RAS, a CAS, a TR/OE, and a write enable signal (WE terminal).

The SAM-RAM transmission direction control signal (SE terminal) is applied as a drive signal for two drivers (354 and 355). When this signal shows a low level ('0'), data are transmitted from the RAM to the SAM; and when it shows a high level ('1'), data are transmitted from the SAM to the RAM. Other output signals (RAS, CAS, TR/OE, and WE) are applied as input signals to/from the RAM 322 and used for controlling the RAM 322.

Next, the operation of the control circuit during the data transmission is described.

First, a data transmission request is issued by system A 301 to the CPU 311 (S1 in FIG. 4A). Then, the CPU 311 outputs a RAM access leading address register write signal (TARW) and a RAM access leading address data from the TARW terminal and the DATA terminal respectively. The TARW signal is inputted to the RAM access leading address register 316 and the three-input OR gate 352. In response to this signal, the RAM access leading address register 316 sets a leading address in the register (S2 in FIG. 4A), and outputs an address signal (MA) of the RAM to the RAM 322. The output of the three-input OR gate 352 is applied as a high level ('1') while the TARW signal is at a high level ('1'). According to this signal, the control circuit 353 for controlling the RAM-SAM transmission and the transmission direction activates the operation of the RAM-SAM transmission.

Then the CPU 311 outputs a transmission direction designating signal from the DIR terminal. The signal is applied to the control circuit 353 for controlling the RAM-SAM transmission and the transmission direction. According to the signal, the control circuit 353 outputs a SAM-RAM transmission direction control signal from the SE terminal. Now, the SE terminal shows a high level ('1'), and the transmission direction is set from the SAM to the RAM (S3 in FIG. 4A).

Next, the CPU 311 outputs a transmission word register write signal and a transmission word number from the TCRW terminal and the DATA terminal, respectively. These signals are sent to the transmission word register 315, and the number of transmission words is set in the register (S4 in FIG. 4A).

The transmission word register write signal (TCRW) is also applied to the transmission request signal control circuit 350, and the transmission request signal control circuit 350 outputs a transmission request signal to system A 301. In response to the signal (TREQ), system A 301 starts data transmission (S5 in FIG. 4A). When all data are transmitted from system A 301, it outputs an end-of-transmission signal from the TEDN terminal (S6 in FIG. 4A). This signal (a high level) is applied to the three-input OR gate 352. Then the output of the three-input OR gate 352 shows a high level ('1'), and the input of the control circuit 353 for controlling the RAM-SAM transmission and the transmission direction shows a high level. Now, the rata transmission starts between the SAM and the RAM (S7 in FIG. 4A).

During the data transmission between the SAM and the RAM, a clock pulse CP is applied to the transmission word register 315 every time one word is transmitted, and the number of words is counted down. The counter shows '0' when all data are transmitted from the SAM 312 to the RAM 322. When the output Q shows '0', the output of the negative input AND gate 351 shows '1', and the output of the three-input OR gate 352 also shows '1'. When the signal is applied to the control circuit 353 for controlling the RAM-SAM transmission and the transmission direction, an end of the RAM-SAM transmission is notified.

The processes described above complete the data transmission to the RAM 322. The data transmission from system A 301 to system B 302 is completed after the CPU 311 issues to system B 302 a request of a read from the RAM 322 (S8 in FIG. 4A) and system B 302 reads data from the RAM 322.

The operation of the control circuit when data are transmitted from system B 302 to system A 301 is described as follows. The explanation starts at the point where the transmission is completed (S12 in FIG. 4B), after the transmission data are transmitted from system B 302 to the RAM 322 (S10 and S11 in FIG. 4B).

When the CPU 311 receives the notification indicating the end of the data transmission to the RAM 322, the CPU 311 outputs a RAM access leading address register write signal (TARW) and a RAM access leading address data from the TARW terminal and the DATA terminal, respectively. The TARW signal is applied to the RAM access head address register 316 and the three-input OR gate 352. In response to the signal, the RAM access head address register 316 sets a leading address in the register (S13 in FIG. 4B), and outputs an address signal (MA) of the RAM to the RAM 322. The three-input OR gate 352 shows a high level ('1') while the TARW signal shows a high level ('1'). According to the signal, the control circuit 353 for controlling the RAM-SAM transmission and the transmission direction activates the RAM-SAM transmission.

The CPU 311 then outputs a transmission direction designating signal from the DIR terminal. This signal is applied to the control circuit 353 for controlling the RAM-SAM transmission and the transmission direction. According to this signal, the control circuit 353 outputs a SAM-RAM transmission direction control signal from the SE terminal. Now, the SE terminal shows a low level ('0') and the transmission direction is set from the RAM to the SAM. When the transmission direction is set, the data transmission is started from the RAM 322 to the SAM 321 (S14 in FIG. 4B). When the transmission is completed, the CPU 311 outputs a transmission word register write signal and the number of transmitted words from the TCRW terminal and the DATA terminal, respectively. These signals are sent to the transmission word register 315, and the number of transmitted words is set in the register 315 (S15 in FIG. 4B).

The transmission word register write signal (TCRW) is also applied to the transmission request signal control circuit 350. The transmission signal control circuit 350 outputs a transmission request signal (TREQ) to system A 301. In response to this signal (TREQ), system A 301 starts reading data from the SAM 321 (S16 in FIG. 4B). The data corresponding to the number of words set in the transmission word register 315 are read from the SAM 321. The above processes complete the transmission from the system B 302 to system A 301.

Figure 6:
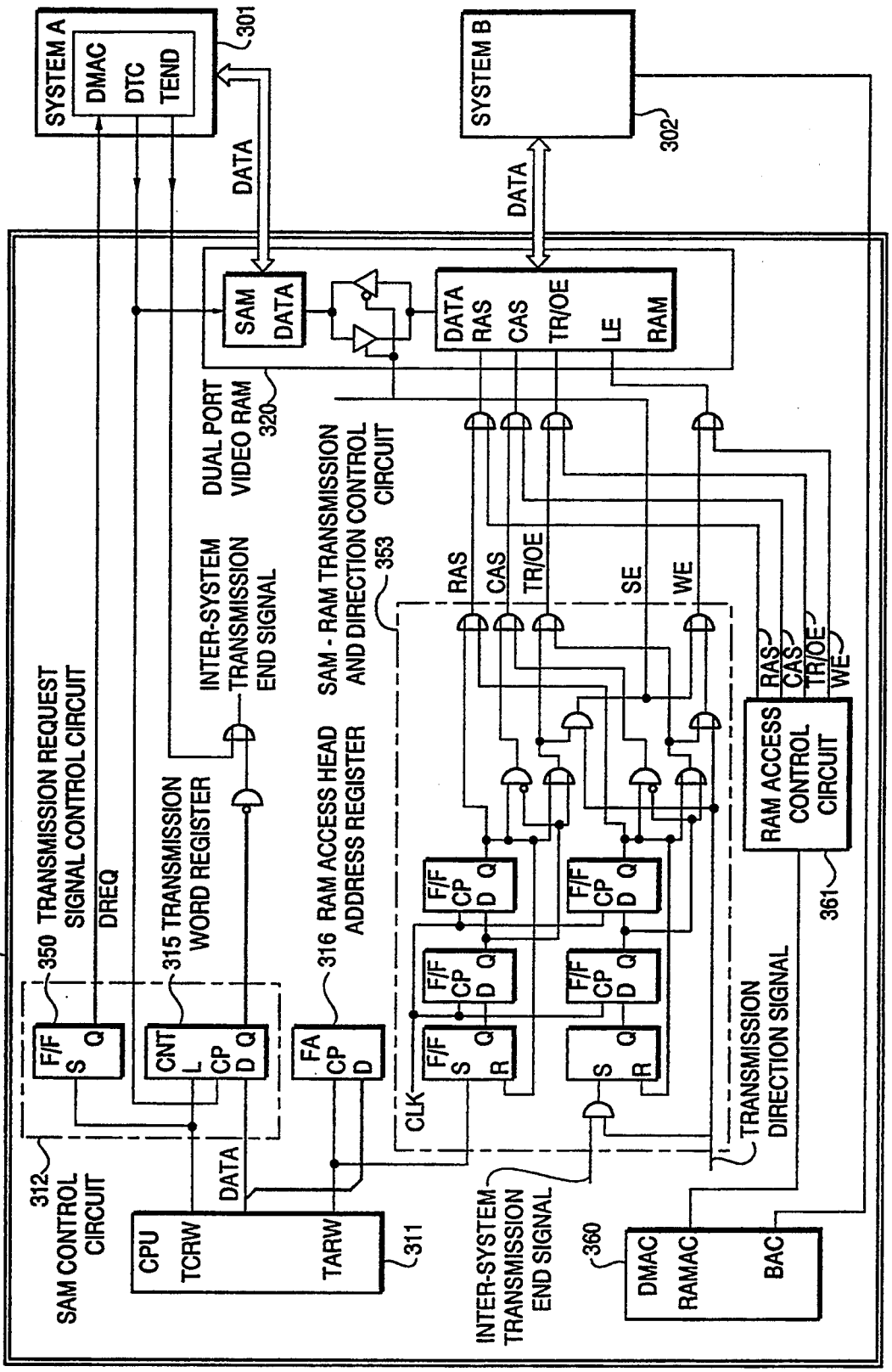
FIG. 6 is another diagram of the transmission control circuit.

FIG. 6 shows another detailed diagram of the control circuit 310 in which the control circuit 353 for controlling the RAM-SAM transmission and the transmission direction is shown more in detail. Like numbers designate like parts between FIGS. 5 and 6 and their explanations are omitted. A direct memory access controller DMAC 360 transmits a RAM access signal RAMAC to the RAM 322 through a RAM access control circuit 361. The DMAC 360 sends a system B access signal BAC to system B 302.

What is claimed is:

1. A communication control system transmitting data between two systems including system A transmitting at a first transmission speed and system B transmitting at a second transmission speed, said communication control system comprising:

transmission and speed converting means for converting between the first and second transmission speeds when transmitting the data between the system A and the system B, wherein said transmission speed converting means comprises a dual port video RAM including:

a first port connected to the system A, receiving the data from the system A and transmitting the data to the system A at the first transmission speed;

a serial access memory, connected to said first port, for storing data;

a random access memory, connected to said serial access memory, for storing the data; and a second port connected to said random access memory and the system B, receiving the data from the system B and transmitting the data to the system B at the second transmission speed; and control means for controlling the transmission of the data between said random access memory and said serial access memory, wherein said control means includes:

a RAM leading address setting register having a leading address for setting the leading address at which the data accumulates in said random access memory; and a transmission data capacity setting register indicating a data capacity of the data stored in said serial access memory.

2. A communication control device according to claim 1, wherein said control means sets in said random access memory leading address setting register said leading address from which the data is stored in said RAM in said transmission speed converting means.

3. A communication control device according to claim 1, wherein said control means sets in said transmission data capacity setting register a number of transmission data words when the data is stored in said serial access memory of said transmission speed converting means.

4. A communication control device according to claim 1, wherein responsive to a transmission data write command to said random access memory of said transmission speed converting means generated by and received from the system A, said control means sets said leading address in said RAM leading address setting register, sets a direction of internal transmission from said serial access memory to said random access memory, sets a number of words to be transmitted in said transmission data capacity setting register, controls transmission of the data from said serial access memory to said random access memory after completion of data transmission from the system A to said serial access memory, and requests the system B to read the data from said random access memory.

5. A communication control device according to claim 1, wherein, responsive to receiving a command to read the data from said serial access memory to the system A when the data is transmitted from the system B to the system A, said control means sets said leading address in said RAM leading address setting register, internally transmits the data from said random access memory to said serial access memory, controls transmission of the data from said serial access memory to the system A after setting a number of words to be transmitted in said transmission data capacity setting register, and activates a transmitting process for performing the transmitting.

6. The communication control system according to claim 1,
wherein the data includes first and second data,
wherein said transmission and speed converting means first accumulates in said serial access memory the first data as first accumulated data when the first data is transmitted from the system A to the system B at the first transmission speed, and said first accumulated data is transmitted from said random access memory to the system B at the second transmission speed, and
wherein said transmission and speed converting means accumulates in said random access memory the second data as second accumulated data when the second data is transmitted from the system B to the system A at the second transmission speed, and said second accumulated data is transmitted from said serial access memory to the system A at the first transmission speed, realizing the transmitting of the data between the system A having the first transmission speed and the system B having the second transmission speed.

7. The communication control system according to claim 1,
wherein when the data is transmitted from the system A to the system B, the system A generates and transmits a data write instruction to said control means of the communication control system, and
wherein, responsive to said data write instruction received from the system A, said control means sets said leading address of said RAM leading address setting register, determines an internal transmission direction in said dual port video RAM, sets said data capacity of said transmission data capacity setting register, and controls the transmission of the data from the system A to the system B via said serial access memory and said random access memory by requesting the system B to read the data stored in said random access memory.

8. The communication control system according to claim 1,
wherein when the data is transmitted from the system B to the system A, the system B generates and transmits an instruction to said control means of the communication control system, and
wherein, responsive to said instruction received from the system B, said control means sets said leading address of said RAM leading address setting register, controls the transmission of the data in said dual port video RAM from said random access memory to said serial access memory, sets said data capacity of said transmission data capacity setting register, and controls the transmission of the data from said serial access memory to the system A by requesting the system A to read the data stored in said serial access memory.

* * * * *

UNITED STATES PATENT AND TRADEMARK OFFICE
CERTIFICATE OF CORRECTION

PATENT NO. : 5,394,399
DATED : February 28, 1995
INVENTOR(S) : Kawasaki

It is certified that error appears in the above-indentified patent and that said Letters Patent is hereby corrected as shown below:

Col. 2, line 66, delete "comprises and insert --comprises--

Col. 3, line 25, delete "shows"

line 31, delete "shows".

Col. 13, line 2, delete "wherein" and insert --wherein,--.

Signed and Sealed this

Twentieth Day of June, 1995

Attest:

BRUCE LEHMAN

Attesting Officer

Commissioner of Patents and Trademarks